US008590020B1

(12) United States Patent
Orlovskaya

(10) Patent No.: US 8,590,020 B1
(45) Date of Patent: Nov. 19, 2013

(54) AUTHENTICATION SYSTEM AND METHOD USING ARRANGEMENTS OF OBJECTS

(76) Inventor: Veronika Orlovskaya, Moscow (RU)

( * ) Notice: Subject to any disclaimer, the term of this patent is extended or adjusted under 35 U.S.C. 154(b) by 1329 days.

(21) Appl. No.: 12/017,637

(22) Filed: Jan. 22, 2008

Related U.S. Application Data

(60) Provisional application No. 60/885,737, filed on Jan. 19, 2007.

(51) Int. Cl.
*H04L 29/06* (2006.01)

(52) U.S. Cl.
USPC ...... 726/5; 726/17; 726/26; 726/28; 713/182; 713/183

(58) Field of Classification Search
USPC .......... 726/2–7, 17–19, 26–28; 713/182, 183
See application file for complete search history.

(56) References Cited

U.S. PATENT DOCUMENTS

| | | | |
|---|---|---|---|
| 6,737,956 B1 * | 5/2004 | Kimura | 340/5.54 |
| 7,376,899 B2 * | 5/2008 | Mantyla | 715/741 |
| 7,644,433 B2 * | 1/2010 | Mizrah | 726/2 |
| 8,001,613 B2 * | 8/2011 | Duncan | 726/28 |
| 2002/0029341 A1 * | 3/2002 | Juels et al. | 713/184 |
| 2004/0172564 A1 * | 9/2004 | Federova et al. | 713/202 |

* cited by examiner

*Primary Examiner* — Morshed Mehedi
*Assistant Examiner* — Jason Lee
(74) *Attorney, Agent, or Firm* — Ronald Abramson; Hughes Hubbard & Reed LLP

(57) ABSTRACT

A system and method is presented for authentication, so as to control access to a resource. A set of objects (for example, a set of images) is established in advance between the user and the service for which the user is to be authenticated. During the authentication, the user, instead of inputting an alphanumeric password, will be sent several sets (e.g., tables) containing the previously specified objects (e.g., images) in some arrangement (e.g., spatial pattern) among other objects (images). In order to authenticate, the user is shown additional tables, and must determine, as to each, whether it contains the same set of specified objects in the same spatial relationship as in the first table shown. After the user has correctly identified which tables reflect the specified objects in the requisite pattern, the user will be considered authenticated, and will then be granted access to the requested resource (for example, a bank account).

18 Claims, 5 Drawing Sheets

AUTHENTICATION SYSTEM AND METHOD USING ARRANGEMENTS OF OBJECTS

CROSS-REFERENCE TO RELATED APPLICATION

This application claims the benefit of the filing date of U.S. Provisional Application No. 60/885,737 ("User authentication in computer-based systems using the spatial relationship of selected images to each other"), filed Jan. 19, 2007. The entire disclosure of said provisional patent application is hereby incorporated by reference.

BACKGROUND OF THE INVENTION

1. Field of the Invention

The present invention is in the field of authentication, and concerns a secure method of performing authentication based on the user being able to demonstrate recognition of a complete set of previously specified objects by identifying patterns comprising said objects.

2. Background of the Related Art

Computer-based systems are often accessed by unauthorized users. One of the main methods for such unauthorized access is the theft of passwords belonging to the authorized users. Password theft can be effectuated either by observing or surreptitiously logging the password entry performed by the authorized user or by intercepting the Internet transmission of the password entered by the authorized user. Utilization of the present invention will greatly assist in preventing these types of password compromise.

The current state of the art in authentication is suboptimal, because existing methods require, as part of the process that must be performed each time a user is authenticated, the entry and/or transmission over a network of a password or similar secret word, phrase or object. Even if the password or similar word, phrase or object is encrypted, such a process exposes it to interception and (if encryption was used) eventual decryption. There is at present a need for systems that reduce such vulnerabilities.

SUMMARY OF THE INVENTION

In accordance with one embodiment of the invention, a set of objects (for example, a set of images) is established in advance between the user and the service for which the user is to be authenticated. During the authentication, the user, instead of inputting an alpha-numeric password, will be sent several sets (e.g., tables) containing the previously specified objects (e.g., images) in some arrangement (e.g., spatial pattern) among other objects (images). The user will memorize (or be able to refer to) the spatial relationship of selected images to each other in the first table shown. In order to authenticate, the user is shown additional tables, and must determine, as to each, whether it contains the same set of specified objects in the same spatial relationship as in the first table shown. After the user has correctly identified which tables reflect the specified objects in the requisite pattern, the user will be considered authenticated, and will then be granted access to the requested resource (for example, a bank account).

Further features, embodiments, and advantages of the invention are illustrated by the accompanying drawings and further explained in the detailed description that follows.

BRIEF DESCRIPTION OF THE DRAWINGS

In the annexed drawings.

The details of these drawings and their inter-relationships and use of the matter depicted therein in practicing the present invention are explained in the following detailed description.

DETAILED DESCRIPTION

The following is a description of several embodiments of various aspects of the invention. These embodiments are illustrative only. The invention is limited only by the scope of the claims that are appended hereto, and is by no means limited to particular examples described below.

The operation of the invention, in one embodiment, is as follows:

Registration

Registration to the secure computer-based system is preferably performed in a secure location. The authentication system may ask the user to select an alpha-numeric (or equivalent) user ID, using methods known to those having skill in the art. A conventional password may optionally be established as well at this time, to achieve "layered authentication" (although such use of a conventional password would merely supplement and not duplicate or replace the protection provided by the present invention).

Figure 1:
FIG. 1 is a portion of a screen display showing an example of images presented to the user during registration, when the user is selecting images for the first time.

The user will then be presented with a set of objects, for example, an array of images as shown in FIG. 1. For purposes of discussion herein, these will be referred to as "tables" of "images", but it will be understood that the "objects" may in fact be images, as shown, or may be other perceptible representations, such as words, numbers, letters, symbols, shapes, colors, patterns, etc. or even sounds, and that the "set" may be a linear sequence or (as in FIG. 1) any spatially arranged representation of the objects (e.g., shape, pattern, configuration, etc.).

The user will select from the table displayed a set of one or more (most preferably five (5)) images, to be used as "Key Images" in the authentication process. FIG. 1 shows the Key Images circled. In practice, the authentication system will send to the user's computer the code required to enable the client-side actions described here.

The Key Images (or information sufficient to identify the Key Images) will be transmitted to the authentication system and will be associated with the user's profile information.

To improve accuracy, the authentication system may ask the user to select the same images from the same table (FIG. 1) for a second time. In such an embodiment, the user will attempt to repeat the selection of the same images. These selected images (or information identifying the images) are transmitted to the authentication system, which compares them with the first set of images already stored in the user profile. If the second set of selected images matches the first set of images, the images are associated with the user profile and the registration is completed. Otherwise, the user is asked to repeat the image selection process starting again from the second selection step.

When the Key Images (or information identifying the images) are transmitted from the user's computer to the authentication system, the images (or identifiers) are preferably encrypted in order to lessen the opportunity for theft or security breach (or the entire session may be encrypted, via SSL or other suitable means known to those having skill in the art).

Authentication

During the authentication, the user, instead of inputting an alpha-numeric password, will be sent several sets (e.g., tables) containing the previously specified objects (e.g., images) in some arrangement (e.g., spatial pattern) among other objects (images). Preferably, to limit the ability of a person intercepting the authentication dialog to deduce the identity of objects (images), the sets will be sent as a single entity—for example, in an image-based protocol, the system will take, e.g., 200 images (of which five, for example, are the Key Images) and convert them into one composite image. The composite image will be the only one transmitted to and displayed for the user. (Similarly, the same compositing technique can be applied to registration images, above.)

The first table sent during authentication will contain all of the user's previously designated Key Images. This table will be referred to as the "Key Table". The user will be asked to memorize (or to be able to refer to) the spatial relationship of the Key Images to each other, as arranged in the Key Table. The user will then be shown at least one, and preferably a series of, additional tables (each referred to as a "Selection Table"). In order to authenticate, the user must determine, as to each Selection Table, whether it contains the same set of specified objects in the same spatial relationship as in the Key Table. After the user has correctly identified which Selection Tables represent the Key Images in the requisite pattern, the user will be considered authenticated.

Preferably, the authentication system asks the user to enter his ID, which is authenticated by methods known to those of skill in the art, optionally with a conventional password. Preferably, the next steps are performed only after the user's ID is authenticated.

Figure 2:
FIG. 2 is a portion of a screen display showing an example of a Key Table presented during authentication, containing the user's Key Images in a pattern among other images.

The user is presented with an array of images (Key Table), as shown in FIG. 2. The exact number of images in the Key Table, as well as the Selection Tables in the various FIG. 3 representations (described below), will be determined by the specific implementation of this process. Preferably, a set of approximately 200 images may be used for each of the various tables (including as well the table used during registration (FIG. 1)).

The Key Table thus presented to the user contains, amidst other images, the entire set of Key Images chosen by the user during registration. The user must find and remember the pattern that is made among the Key Images. For example, the Key Images can form different geometric patterns or shapes in the Key Table. (The combination of the selected images and their spatial arrangement can be referred to in this context as the "password" (though not to be confused with a conventional password in the form of a string literal)). Preferably, there should be only one set of the registration Key Images present in the Key Table (i.e., there should not be duplicate or different arrangements of the complete set of Key Images in the image array).

In the example shown in FIG. 2, the five Key Images selected during registration (circled for purposes of the present explanation) are shown, arranged in a line. The user has to find the Key Images in the Key Table (FIG. 2), and remember the spatial arrangement in which they are presented.

Figure 3A:
FIG. 3A is a portion of a screen display showing a Selection Table presented to test the user's ability to identify the pattern of Key Images that had been reflected in the Key Table previously shown.

The authentication system then presents another image table (Selection Table) to the user (FIG. 3A). The Selection Table shown in FIG. 3A differs from the Key Table (FIG. 2), but also contains (again, among various other images) all of the Key Images selected by the user during the registration. This Selection Table also presents the specified set of Key Images in the same spatial arrangement (relatively among the Key Images) as shown in the Key Table, but (as is preferable) the pattern appears in a different position in the table (in FIG. 3A, the pattern appears near the top of the table).

The user must determine if in the Selection Table (FIG. 3A) the Key Images are all present in the same relative arrangement as in the Key Table (FIG. 2). In the example shown in FIG. 3A, they do appear to be arranged in a line in the same manner as shown in FIG. 2. The correct user response therefore is affirmative—e.g., to click a provided "OK" button displayed with the table.

Figure 3B:
FIG. 3B is a portion of a screen display showing another Selection Table presented to repeat the test of the user's ability to identify the pattern of Key Images that had been reflected in the Key Table previously shown.

The procedure described in the preceding paragraph is then repeated with different image arrays (Selection Tables), for example, arrays such as that shown in FIG. 3B. For each, the user must determine, and appropriately respond, whether the Selection Table shown contains all of the Key Images in the same relative spatial arrangement as was shown in the Key Table (FIG. 2). As can be seen from the circled images, FIG. 3B also reflects the same pattern of Key Images as was shown in the Key Table—this time just above the middle of the table—and would accordingly also require an affirmative response ("OK") from the user.

Figure 4:
FIG. 4 is a portion of a screen display showing another Selection Table presented to test the user's ability to identify the pattern of key images that had been reflected in the Key Table previously shown, in which the same keys are not represented in the pattern previously shown.

In the case of each Selection Table repetition, the authentication system asks the user to approve or reject the Selection Table presented. The Selection Table should be approved only if the spatial relationship of the Key Images in that array is identical to the spatial relationship of Key Images in the Key Table (FIG. 2). The Selection Table should be rejected if the spatial relationship of the Key Images is not identical to the spatial relationship of the Key Images in the Key Table. FIG. 4 shows another example of a Selection Table, but in which the Key Images are not represented in the same pattern as had been presented in the Key Table; accordingly the user should reject this table.

These methods described herein may be implemented using a computer program stored on a machine-readable medium. The code required for the client-side actions may be sent to the client computer by the server, during communications between those computers.

If the user both correctly approves and correctly rejects all the Selection Tables presented to him, access will be granted to the requested resource; otherwise an error message may be generated and displayed.

Preferably, the above-described Selection Table step is repeated several times. Preferably, the user is not informed of success or failure of any of the individual acceptances or rejections until all repetitions are completed. The exact number of repetitions will be determined by the specific implementation of this process. In one embodiment, the number of repetitions may be five. In another embodiment, the number of repetitions may be six to approximately ten. The image arrays presented in the repetitions of the Selection Table step may contain one or more tables that should be rejected, and preferably at least one that should be accepted. Preferably, the ordering of the Selection Tables to be accepted and to be rejected will be randomized. The Selection Tables used can all be constructed from the same set of images, in different arrangements, as well as patterns of other images (such other patterns each having the same number of images as the number of Key Images), which also repeat from table to table, so as to reduce the possibility of deducing the spatial "password" by comparing a number of Selection Tables. In addition, the system can be configured to exclude or "reset" the user or otherwise block further authentication attempts after a pre-specified number of repeated authentication failures.

The Key Table and all Selection Tables are generated on the server and transmitted as a single image. Therefore no encryption is needed to transmit them.

The authentication described herein will typically be performed each time the user wishes to authenticate to the system, for example, to begin a session on the system. Preferably, successive authentication sessions will start with a Key Table having the Key Images in a different arrangement than previously used (either ever used, or recently used).

Those skilled in the art will appreciate, upon reading the foregoing, that an authentication system in accordance with any of the embodiments of the present invention overcomes the limitations of the prior art.

In one aspect, it should be apparent that the present invention does not involve inputting or transmitting a password, pass phrase, token or the like into a machine or over a network in a manner that exposes it to logging, interception or the like. Since the tables contain several images which are part of the password and many images which are not part of the password, even if the authentication is observed, the observer will not be able to ascertain the password. An actual password is not passed between the user and the authentication system during the authentication steps, or during initial registration. All transmissions of tables during the authentication can be unencrypted. Since in this process the tables containing multiple images are transmitted via Internet as a single image, even if these tables are intercepted during the transmission between the user and the central system, the password will not be decipherable from them because these tables also contain many images which are not a part of the authenticating combination.

The foregoing summary, drawings, and detailed descriptions describe various embodiments of the invention and the principles by which the invention operates, and show the advantages that the invention provides over previous solutions. It is believed that the invention has been explained in sufficient detail to enable persons of ordinary skill in the field who study this disclosure to practice the techniques shown, as well as other variations and embodiments thereof within the spirit of the invention that suit their individual needs. For example, a system could be adapted, within the scope of the invention, for vision-impaired users, by using various sounds in place of Key Images, and arranging them in sequences with other sounds, as opposed to image arrays as described above. It may be used to authenticate an actor (whether or not considered the "user") that requires authentication in order to have access to a system resource.

It will be appreciated that additional modifications, variations and features will occur to one of ordinary skill in the art given the benefit of the foregoing disclosure, which modifications, variations and features will be within the scope of the invention, as defined in the following claims.

I claim:

1. A method for authenticating an actor, the actor being associated with a client computer, to a server, the server comprising a computer-based system having an electronic communications connection with the client computer, comprising:
   a) registering the actor with the server, by establishing, through electronic communications with the client computer, a set of registration objects comprising a plurality of registration objects, the registration objects each having an associated human perceptible form when reproduced by the client computer, the registration objects comprising sounds;
   b) authenticating the actor, by
      i. electronically sending to the client computer a key set of objects, the key set of objects comprising the set of registration objects and other objects in addition to the set of registration objects, each of the objects of the key set comprising sounds, and further such that the set of registration objects is arranged within the key set of objects so as to be reproduced on the client computer in a first relative arrangement among the objects in the set of registration objects;
      ii. electronically sending to the client computer one or more selection sets of objects, each selection set of objects also comprising the set of registration objects and other objects in addition to the objects comprising the set of registration objects, each of the objects of the selection set comprising sounds, and further such that the set of registration objects is arranged within the selection set of objects so as to be reproduced on the client computer in a second relative arrangement among the objects in the set of registration objects;
      iii. for each selection set of objects, receiving from the client computer a determination by the actor whether the second relative arrangement in the selection set of objects matches the first relative arrangement in the key set of objects; and
      iv. granting the actor access to a requested resource if the determinations by the actor were correct.

2. The method of claim 1 further comprising providing the actor an array of objects from which to select the set of registration objects.

3. The method of claim 2 further comprising repeating step (a) of claim 1 and comparing the actor's selections to determine that the same selections were made.

4. The method of claim 2 further comprising sending code to the client computer including identifiers for the objects comprising the array of objects.

5. The method of claim 4 wherein said code further contains instructions for encrypting the transmission whereby the actor communicates its selections to the server.

6. The method of claim 1 further comprising repeating step (b)(ii) such that it is performed a total of five times.

7. The method of claim 1 further comprising repeating step (b)(ii) such that it is performed a total of from six to ten times.

8. The method of claim 1 wherein the sets of objects presented in one or more of steps b(i) and b(ii) comprise approximately 200 objects.

9. The method of claim 1 preceded by conventional authentication with a user ID and password.

10. The method of claim 1 wherein, if step (b)(iii) is repeated, one or more selection sets of objects transmitted to the actor shows the set of registration objects in a relative arrangement, situated in a position within the selection object different from the position in which the same relative arrangement was situated in a selection set of objects previously transmitted to the actor during the authentication.

11. The method of claim 1 wherein the key set of objects and the selection sets of objects all contain the same number of objects, and in their entirety each comprise the same set of constituent objects.

12. The method of claim 1 wherein the key set of objects and the selection sets of objects also each contain one or more other of the same sets of other objects in the same relative arrangement, each set containing the same number of objects as the set of registration objects.

13. The method of claim 1 wherein said actor is required by the server to be in a secure location.

14. The method of claim 1, further comprising repeating step (b)(ii), wherein the actor is not informed of success or failure in authentication until all the repetitions are completed.

15. The method of claim 1, further comprising repeating step (b)(ii), wherein the ordering of sets that do and do not contain the entire set of registration objects in the relative arrangement as presented in the key set of objects is randomized.

16. The method of claim 1, further comprising blocking authentication attempts after a pre-specified number of repeated authentication failures.

17. The method of claim 1, further comprising incorporating the set of registration objects in the key set of objects in a different relative arrangement than previously used in prior authentication sessions.

18. A non-transitory machine-readable medium containing computer program instructions for:

c) registering an actor with a server, the actor being associated with a client computer, the server comprising a computer-based system having an electronic communications connection with the client computer, by establishing, through electronic communications with the client computer, a set of registration objects comprising a plurality of registration objects, the registration objects each having an associated human perceptible form when reproduced by the client computer, the registration objects comprising sounds;

d) authenticating the actor, by i. electronically sending to the client computer a key set of objects, the key set of objects comprising the set of registration objects and other objects in addition to the set of registration objects, each of the objects of the key set comprising sounds, and further such that the set of registration objects is arranged within the key set of objects so as to be reproduced on the client computer in a first relative arrangement among the objects in the set of registration objects;

ii. electronically sending to the client computer one or more selection sets of objects, each selection set of objects also comprising the set of registration objects and other objects in addition to the objects comprising the set of registration objects, each of the objects of the selection set comprising sounds, and further such that the set of registration objects is arranged within the selection set of objects so as to be reproduced on the client computer in a second relative arrangement among the objects in the set of registration objects;

iii. for each selection set of objects, receiving from the client computer a determination by the actor whether the second relative arrangement in the selection set of objects matches the first relative arrangement in the key set of objects; and iv. granting the actor access to a requested resource if the determinations by the actor were correct.

\* \* \* \* \*